United States Patent [19]

Bratoljic

[11] 4,282,451

[45] Aug. 4, 1981

[54] SOLID ROTOR FOR ASYNCHRONOUS ELECTRICAL MACHINES

[75] Inventor: Tihomir Bratoljic, Wettingen, Switzerland

[73] Assignee: BBC Brown Boveri & Company Limited, Baden, Switzerland

[21] Appl. No.: 28,660

[22] Filed: Apr. 10, 1979

Related U.S. Application Data

[63] Continuation of Ser. No. 818,804, Jul. 25, 1977.

[30] Foreign Application Priority Data

Aug. 9, 1976 [CH] Switzerland .................. 10129/76

[51] Int. Cl.³ .............................................. H02K 1/22
[52] U.S. Cl. .................................... 310/262; 310/261; 310/64
[58] Field of Search ............... 310/261, 262, 264, 265, 310/270, 273, 195, 52, 59, 64, 65, 66, 42, 216, 217

[56] References Cited

U.S. PATENT DOCUMENTS

| 911,081 | 2/1909 | Smoot et al. ........................ 310/262 |
| 920,846 | 5/1909 | Erben .................................. 310/64 X |
| 1,136,942 | 4/1915 | Cutten ................................ 310/216 |
| 3,504,153 | 3/1970 | Beyersdorf .......................... 310/42 |
| 3,582,696 | 6/1971 | Rosenberry, Jr. ............... 310/262 X |

FOREIGN PATENT DOCUMENTS 567345  9/1975  Switzerland ............................. 310/262

OTHER PUBLICATIONS

*IBM Technical Disclosure Bulletin,* Grooved Rotor for Hysteresis Motor, by J. M. Ratajski, vol. 14, No. 11, Apr. 1972, p. 3288.

Primary Examiner—Mark O. Budd
Attorney, Agent, or Firm—Burns, Doane, Swecker & Mathis

[57] ABSTRACT

A solid rotor made from steel for use in an asynchronous electrical machine wherein, for the purpose of increasing its otherwise poor electrical conductivity and thereby to reduce its electrical losses, the end faces of the rotor are provided with concentric annular rings separated by intervening grooves.

10 Claims, 9 Drawing Figures

SOLID ROTOR FOR ASYNCHRONOUS ELECTRICAL MACHINES

This is a continuation of application Ser. No. 818,804 filed July 25, 1977.

This invention relates to asynchronous electric machine rotors.

Solid rotors used in asynchronous electrical machines are usually constructed of steel and are advantageous on technical grounds both as regards balance and as regards heat dissipation. On the one hand the robustness of such a rotor ensures high frequencies of both torsional and bending vibration, thus making possible high speeds of rotation and high powers, and on the other hand a high thermal storage capacity and thus advantageous starting characteristics are obtained. The disadvantages of solid rotors lie in the poor electrical conductivity of the rotor steel, in the small depth of penetration of the field resulting from the high permeability and in the high losses thus occasioned.

It is already known to introduce axial grooves on the rotor circumference, these being placed either on the rotor circumference, these being placed either in the vicinity of the ends of the rotor (Patent Specification No. 266,780) or extending up to the ends (CEN Techniques June 1973, No. 87, page 22 et seq.). These axial grooves produce an increase of the depth which the magnetic flux penetrates into the rotor and the electrical conductivity of the teeth formed between the slots loads to a reduction of the electrical losses. In Swiss Patent Specification No. 488 311 there is described and illustrated a rotor of solid iron that exhibits holes parallel to the axis. The principal purpose of these bores is to improve the cooling of the rotor, though in addition a reduction of the electrical losses is obtained. These holes thus correspond to arrangements in which axial slots are covered over, for example by means of wedges. In Bödofeld/Sequenz "Electrical Machines", Vienna—New York 1971 at page 193 there are described solid rotors that have on their end faces copper rings that are mechanically and electrically connected with the rotor. These constructional modifications cause the rotor to lose its robustness and the demands on the connections as regards good electrical conductivity and mechanical strength are very high. Impermissibly high thermal expansion stresses often appear at the connections. Swiss Patent Specification No. 566,664 discloses a solid steel rotor that is provided over the active part of the rotor length with circumferential grooves that serve to mitigate additional losses resulting from harmonics. Another constructional solution is described and illustrated in Swiss Patent Specification No. 244 439. The solid rotor is provided with grooves on the outer surface opposed to the stator, running circumferentially about the rotor, in which there is placed a metal of higher electrical conductivity than that of iron. Cooling fins are provided by unfilled grooves at the ends of the rotor. In "Proceedings of the Institution of Electrical Engineers", Vol. 121, No. 3, March 1974, at page 197 et. seq. there is described and illustrated another construction of solid rotor. The outer cylindrical portion of the rotor has a substantially greater axial length than the inner cylindrical supporting portion, so that it forms a shell that extends beyond the supporting portion. The disadvantage of this solution is that it is suitable only for smaller machines (e.g. up to 1 kW), since this form of rotor necessary on magnetic grounds, cannot withstand the mechanical demands made upon it in larger machines.

The particular object of the invention is to provide a solid rotor for an asynchronous machine that does not suffer from the disadvantages of the prior art machines and ensures a reduction of the electrical losses as compared with known machines.

According to the present invention there is provided a solid rotor for an asynchronous electrical machine wherein there are provided on the rotor end faces annular rings separated by intervening grooves.

The advantage obtained by the use of the invention is that the electrical losses are reduced by the presence of the rings, while the rotor retains its robust constructional form. The connections necessary when copper short-circuiting rings are used, that transmit the high thermal expansion stresses only poorly, are absent.

The rings are advantageously formed by preferably concentric cylindrical grooves. This mode of construction is very advantageous, since it makes possible unhindered passage of electrical currents developed in the thickness of the rotor. In another embodiment the rings are formed by grooves with conical surfaces, the apical angles of the conical surfaces being either the same or of different values. The grooves may be of the same or of different depths. The rings formed on the end surfaces of the rotor by the grooves may also be made use of together with axial grooves formed on the circumference of the rotor, or with axially extending closed grooves or axial bores in the rotor or with tangential grooves, these additional elements mentioned being able to be carried out either so as to connect with at least one of the rings formed by the grooves on the end surface of the rotor, or separately.

Embodiments of the invention are illustrated in a simplified manner in the drawings, of which:

Figure 1:
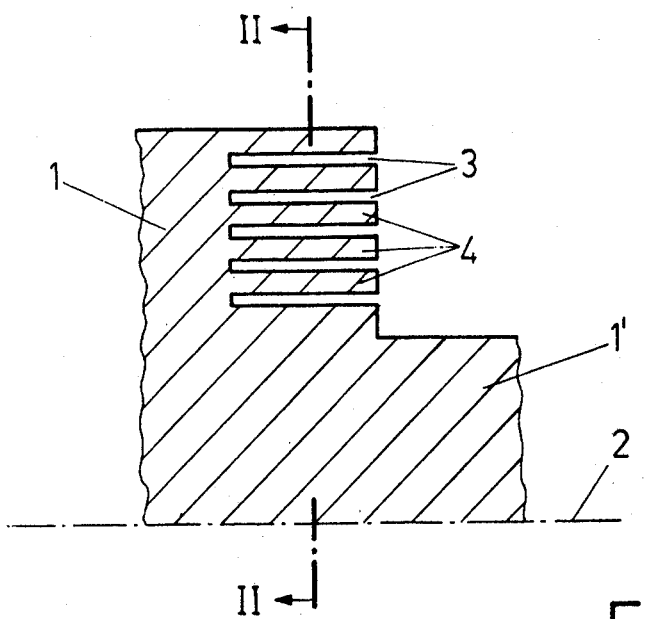
FIG. 1 shows a partial axial section through one end of a rotor embodying the invention.
Figure 3:
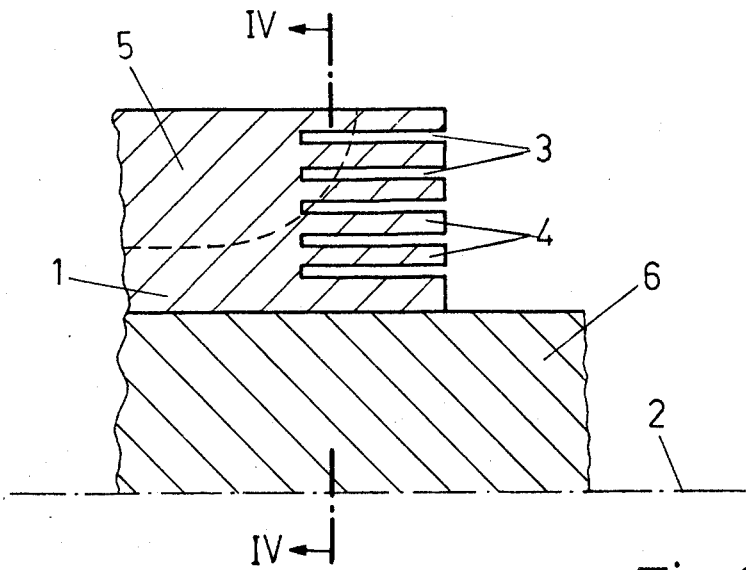
FIG. 3 shows a partial axial section of a second embodiment of the invention.
Figure 4:
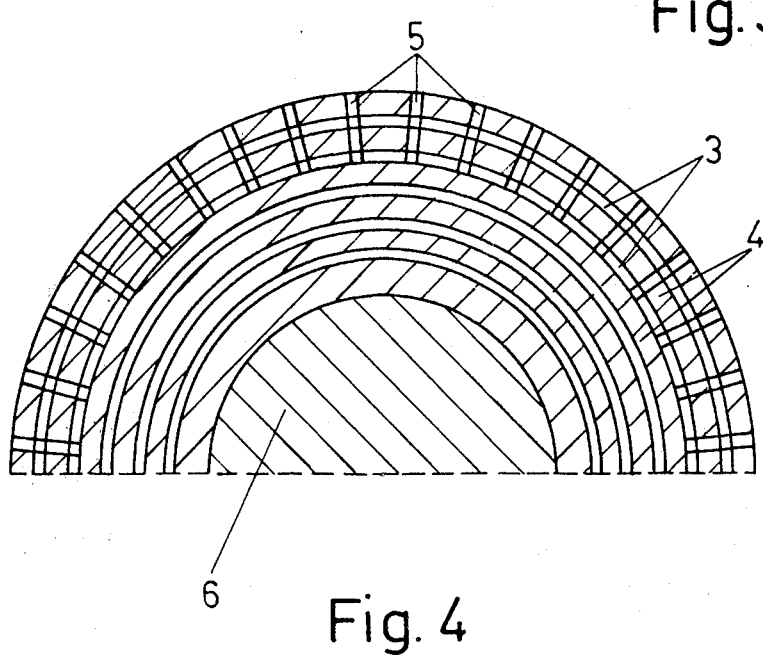
FIG. 4 shows a section taken along the line IV—IV in FIG. 3.
Figure 5:
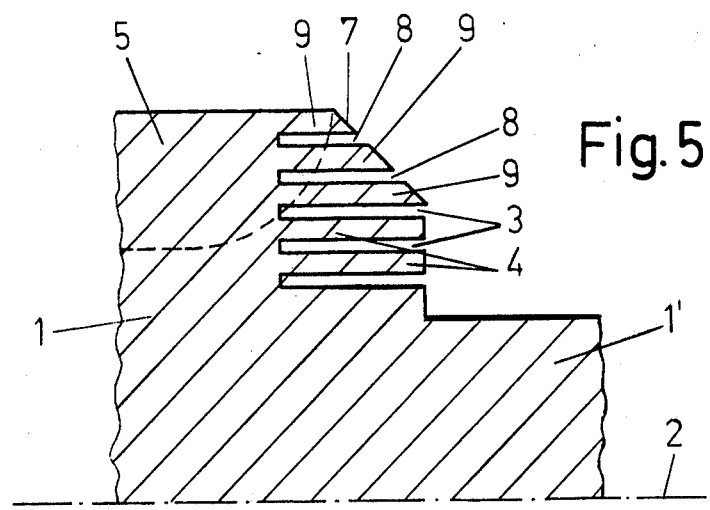
FIGS. 5 to 9 show partial axial sections of other embodiments of the invention.
Figure 6:
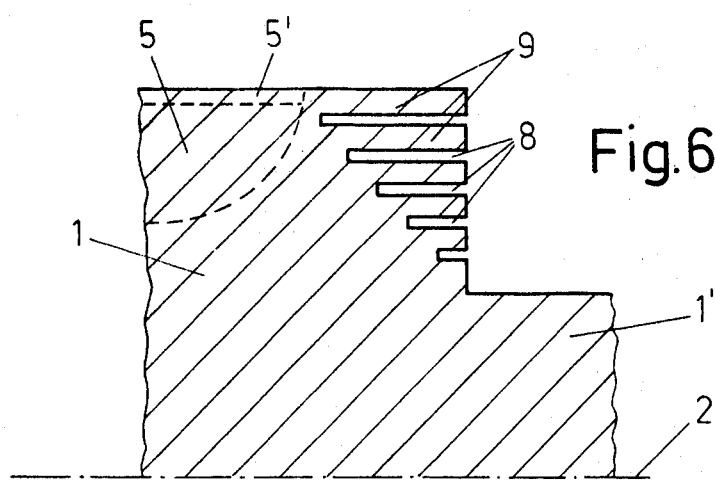
Figure 7:
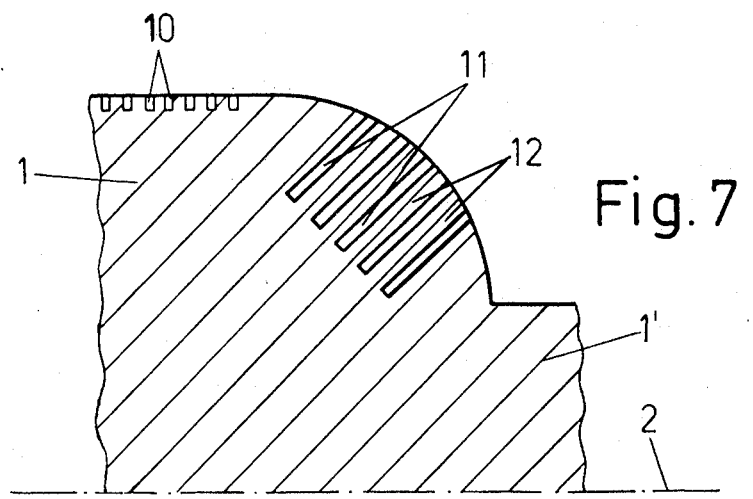
Figure 8:
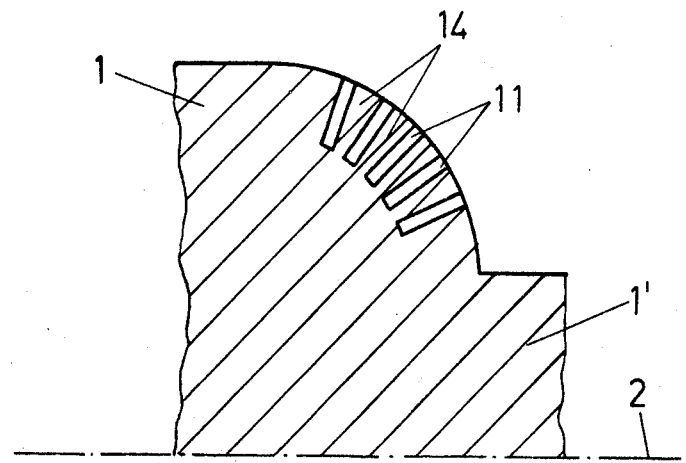

In FIG. 1 a solid rotor of an electrical machine is designated by the reference numeral 1, a shaft portion of the rotor being designated by 1' and the axis of rotation of the rotor by reference 2. Cylindrical slots of equal depth are designated by reference 3 and rings of equal width by the reference 4. In FIGS. 2 to 9, like elements are designated by the same references as are used in FIG. 1. In FIGS. 3 and 4, axially extending grooves are designated by numeral 5 and a rotor shaft by numeral 6. In FIG. 5 a bevel-turned portion of the end face of the rotor 1 is designated by the reference numeral 7, cylindrical grooves of stepped depths by the numeral 8 and rings of stepped width by the numeral 9. In FIG. 6 a closure wedge for the axial groove 5 is designated by the numeral 5'. Circumferential rings in FIG. 7 are designated by the reference numeral 10, conical grooves by the numeral 11 and conical rings by the numeral 12. Conical rings, formed by cones with stepped apical angles in FIG. 8 are designated by the reference numeral 14, conical grooves formed by cones with stepped apical angles are designated by reference numeral 13 in FIG. 9.

Figure 2:
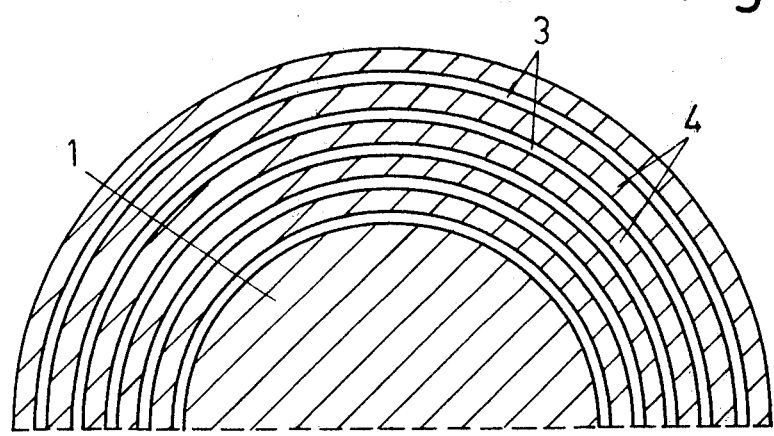
FIG. 2 shows a section taken along the line II—II of FIG. 1.
Figure 9:
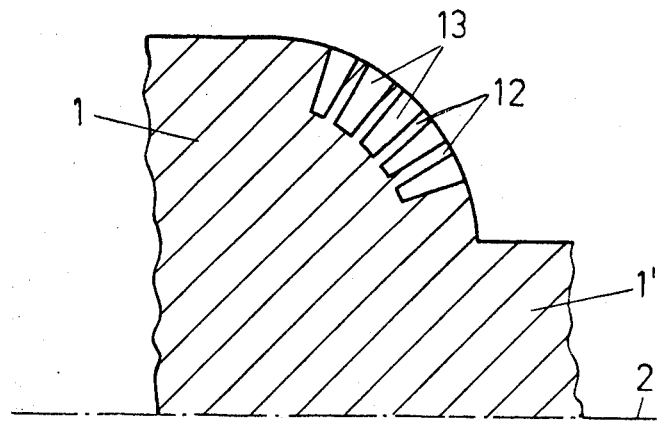

The first embodiment, shown in FIGS. 1 and 2, is illustrated by one end of the rotor 1, of which a portion 1' forms a shaft. Grooves 3 of cylindrical form are produced in the rotor end face and are arranged coaxially. Accordingly, the intervening rings 4 are bounded by coaxial cylindrical surfaces. The embodiment of FIGS. 3 and 4 corresponds generally with that of FIGS. 1 and 2. In this case, however, the rotor is also provided with axially extending grooves 5, that make connection with some of the cylindrical grooves 3 formed in the end face of the rotor 1. In FIG. 5 the rotor 1 is formed with a bevel-turned portion 7, so that the cylindrical grooves 8 are of different depths. As shown in FIG. 6, the cylindrical grooves 8 may be made of different depths, and so form rings 9 of stepped widths. In this case the axial groove 5 is closed by means of a closure wedge 5'. FIG. 7 shows a further embodiment. Over the active part of its length the rotor 1 is provided with circumferential grooves 10 and conical grooves formed in the end face are bounded by conical surface of equal apical angles. The conical surfaces of the rings 14 in FIG. 8 and the grooves 13 in FIG. 9 are each made of constant width.

The invention is obviously not limited to the arrangements illustrated in the drawings. The dimensions of the individual grooves and/or rings may also be made different, e.g. stepped.

What we claim is:

1. A solid rotor for an asynchronous electrical machine wherein annular rings separated by intervening grooves are provided on the rotor end faces and wherein the rings are formed between grooves bounded by conical surfaces.

2. A rotor in accordance with claim 1 wherein the conical surfaces bounding the grooves have equal apical angles.

3. A rotor in accordance with claim 1 wherein the conical surfaces bounding the grooves have different apical angles.

4. A rotor in accordance with claim 1 wherein the grooves are of equal depths.

5. A rotor in accordance with claim 1 wherein the grooves are of mutually different depths.

6. A rotor in accordance with claim 1 having in addition to the grooves formed in its end face, axially extending grooves formed on its periphery.

7. A rotor in accordance with claim 6 wherein the axially extending grooves are in communication with at least one of the grooves formed in the end face of the rotor.

8. A rotor in accordance with claim 26 wherein the axially extending grooves are formed separately from the grooves in the end face of the rotor.

9. A rotor in accordance with claim 1 and having in addition to the grooves formed in its end face, axially extending closed grooves or bores.

10. A rotor in accordance with claim 1 and having in addition to the grooves formed in its end face circumferential grooves formed on its periphery.

* * * * *